(12) United States Patent
Wigren et al.

(10) Patent No.: US 8,385,226 B2
(45) Date of Patent: Feb. 26, 2013

(54) RADIO FINGERPRINT METHOD IN A POSITIONING NODE FOR PROVIDING GEOGRAPHIC REGION DATA

(75) Inventors: Torbjörn Wigren, Uppsala (SE);
Robert Baldemair, Solna (SE);
Muhammad Kazmi, Bromma (SE);
Martin Israelsson, Spånga (SE); Dirk Gerstenberger, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 225 days.

(21) Appl. No.: 12/989,453

(22) PCT Filed: Jun. 24, 2008

(86) PCT No.: PCT/SE2008/050754
§ 371 (c)(1),
(2), (4) Date: Oct. 25, 2010

(87) PCT Pub. No.: WO2009/131506
PCT Pub. Date: Oct. 29, 2009

(65) Prior Publication Data
US 2011/0039580 A1 Feb. 17, 2011

Related U.S. Application Data

(60) Provisional application No. 61/047,780, filed on Apr. 25, 2008.

(51) Int. Cl.
*H04L 12/26* (2006.01)
*H04L 12/28* (2006.01)
*H04L 12/56* (2006.01)

(52) U.S. Cl. ..................... 370/252; 370/400

(58) Field of Classification Search .................. None
See application file for complete search history.

(56) References Cited

U.S. PATENT DOCUMENTS

| | | | | |
|---|---|---|---|---|
| 5,448,760 | A * | 9/1995 | Frederick | 455/410 |
| 6,522,296 | B2 * | 2/2003 | Holt | 342/453 |
| 6,920,329 | B2 * | 7/2005 | Kennedy et al. | 455/456.1 |
| 7,096,030 | B2 * | 8/2006 | Huomo | 455/456.3 |
| 7,429,914 | B2 * | 9/2008 | Carlson et al. | 340/286.01 |
| 2010/0317372 | A1 * | 12/2010 | Wigren et al. | 455/456.6 |

* cited by examiner

*Primary Examiner* — Ayaz Sheikh
*Assistant Examiner* — Blanche Wong

(57) ABSTRACT

A method for providing geographic region data includes receiving geographic position data associated with a location point of a first user equipment and receiving a first radio fingerprint. The method also includes associating the received first radio fingerprint with the received geographic position data and clustering the received geographic position data to create cluster boundaries defining geographical region data. The method further includes receiving a second radio fingerprint and comparing the second radio fingerprint received from the second user equipment with previously received radio fingerprints being associated with geographic region data, and if the second radio fingerprint corresponds to a previously received radio fingerprint, associating the geographic region data of the previously received radio fingerprint with the location point of the second user equipment, and providing the geographic region data, associated with the location point of the second user equipment.

16 Claims, 10 Drawing Sheets

RADIO FINGERPRINT METHOD IN A POSITIONING NODE FOR PROVIDING GEOGRAPHIC REGION DATA

This application claims the benefit of U.S. Provisional Application No. 61/047,780, filed Apr. 25, 2008, the disclosure of which is fully incorporated herein by reference.

TECHNICAL FIELD

The present invention relates to a method and an arrangement in a positioning node and to a method and an arrangement in a user equipment. More particularly the present invention relates to an improved mechanism for geographic position determination.

BACKGROUND

Currently, standardized and commercially deployed radio access technologies are proliferated. Such radio access technologies include the Global System for Mobile communications (GSM), Enhanced Data Rates for GSM Evolution (EDGE), General Packet Radio System (GPRS), Wide-band Code Division Multiple Access (WCDMA), Long Term Evolution (LTE) systems, Wireless Local Area Networks (WLAN), CDMA 2000 and others.

Positioning in wireless communication systems comprising these or other technologies can be performed in many different ways. A typical approach is that a request for positioning is provided. If the positioning information is not already available, some kind of measurement may be performed, and positioning data may be reported to a node responsible for the actual positioning.

Fingerprinting positioning algorithms operate by creating a radio fingerprint for each point of a fine coordinate grid that covers the Radio Access Network. The fingerprint may e.g. comprise the cell IDs that are detected by the terminal, in each grid point, or quantized path loss or signal strength measurements, with respect to multiple radio base stations, performed by the terminal, in each grid point.

Whenever a position request arrives to the positioning method, a radio fingerprint may be computed, based on various parameters which needs to be measured. Thereafter the corresponding grid point is looked up and reported. This requires that the point is unique. A major problem with this approach is that extensive surveying needs to be performed when the fingerprinting database is created. Nevertheless, a possible approach for generating fingerprinted positions may be to perform an extensive surveying operation that performs fingerprinting radio measurements repeatedly for all coordinate grid points of the Radio Access Network. This approach comprise however the disadvantage of becoming substantial, also for small cellular networks. Further, the radio fingerprints are in some instants e.g. signal strength and path loss, sensitive to the orientation of the terminal, a fact that is particularly troublesome for handheld terminals. For fine grids, the accuracies of the fingerprinted positions therefore become highly uncertain.

Further, certain approaches for generating fingerprinted positions may result in positioning data that does not comply with the available standards of today. Updating of different standards is a time-consuming and complex task and the request for using the new positioning methods as soon as possible rushes the implementation of the improvements. A general problem is thus that in order to allow for implementation of different improved positioning methods, reporting of positioning data has to be performed according to new manufacturer-specific non-standard protocols, which in turn limits the use to systems where all parts are provided by the same manufacturer.

Further, there is no measurements defined in LTE that specifically target positioning. As modulation schemes and sequences used in LTE are different from WCDMA, the measurement and positioning procedures used in WCDMA could not be used in LTE.

SUMMARY

It is therefore an object of the present invention to provide an improved mechanism in a wireless communication system for geographic position determination.

According to a first aspect, the object is achieved by a method in a positioning node for providing geographic region data. The geographic region data comprises geographic position data. The positioning node is comprised in a wireless communication system. The positioning node receives geographic position data associated with the location point of a first user equipment comprised in the wireless communication system. The positioning node also receives a first Evolved Universal Terrestrial Radio Access Network, E-UTRAN, radio fingerprint. The E-UTRAN radio fingerprint is based on a first signal propagation time measurement value, which is measured with respect to the location point of the first user equipment. The received first E-UTRAN radio fingerprint is then associated with the received geographic position data. All these steps may be repeated a multitude of times. Received geographic position data, associated with E-UTRAN radio fingerprint exposing certain similarities, are clustered together to create cluster boundaries defining geographical region data. Then a second E-UTRAN radio fingerprint is received. The second E-UTRAN radio fingerprint is based on a second signal propagation time measurement value measured with respect to the location point of a second user equipment. The second user equipment is also comprised within the wireless communication system. The second E-UTRAN radio fingerprint, received from the second user equipment is then compared with previously received E-UTRAN radio fingerprints being associated with geographic region data. If the second E-UTRAN radio fingerprint corresponds to a previously received E-UTRAN radio fingerprint, the geographic region data of the previously received E-UTRAN radio fingerprint is associated with the location point of the second user equipment. Finally, the geographic region data, associated with the location point of the second user equipment is provided.

According to a second aspect, the object is also achieved by an arrangement in a positioning node. The arrangement is configured to provide geographic region data. The geographic region data comprises geographic position data. The positioning node is comprised in a wireless communication system. The arrangement comprises a first receiving unit. The first receiving unit is adapted to receive geographic position data associated with the location point of a first user equipment. The first user equipment is comprised in the wireless communication system. The arrangement also comprises a second receiving unit. The second receiving unit is adapted to receive a first E-UTRAN radio fingerprint. The first E-UTRAN radio fingerprint is based on a first signal propagation time measurement value measured with respect to the location point of the first user equipment. Further, the arrangement comprises a first associating unit. The first associating unit is adapted to associate the received first E-UTRAN radio fingerprint with the received geographic position data. Further yet, the arrangement comprises a clustering unit. The clustering unit is adapted to cluster the received geographic position data based on similarities between the received E-UTRAN radio fingerprints, in order to create cluster boundaries defining geographical region data. In addition, the arrangement comprises a third receiving unit. The third receiving unit is adapted to receive a second E-UTRAN radio fingerprint. The second E-UTRAN radio fingerprint is based on a second signal propagation time measurement value. The second signal propagation time measurement value is measured with respect to the location point of a second user equipment. The second user equipment is comprised in the wireless communication system. The arrangement further comprises a comparison unit. The comparison unit is adapted compare the second E-UTRAN radio fingerprint received from the second user equipment with the first E-UTRAN radio fingerprint, previously received from the first user equipment. The first E-UTRAN radio fingerprint is associated with geographic region data. Further yet, the arrangement also comprises a second associating unit. The second associating unit is adapted to associate the geographic region data of the previously received E-UTRAN radio fingerprint with the location point of the second user equipment. Still further, the arrangement additionally comprises a providing unit. The providing unit is adapted to provide the geographic region data, associated with the location point of the second user equipment.

According to a third aspect, the object is achieved by a method in a user equipment for retrieving geographic region data. The geographic region data is associated with the location point of the user equipment. The user equipment is comprised in a wireless communication system. The wireless communication system also comprises a positioning node. A signal propagation time measurement value is obtained. Based on the obtained signal propagation time measurement value, an E-UTRAN, radio fingerprint is generated. The generated E-UTRAN radio fingerprint is then transmitted to the positioning node. Thereafter, geographic region data, associated with the location point of the user equipment is received.

According to a fourth aspect, the object is also achieved by an arrangement in a user equipment. The arrangement is configured to retrieve geographic region data associated with the location point of the user equipment. The user equipment is comprised in a wireless communication system. The wireless communication system comprises a positioning node. The arrangement comprises an obtaining unit. The obtaining unit is adapted to obtain a signal propagation time measurement value. The arrangement further comprises a fingerprint generating unit. The fingerprint generating unit is adapted to generate an E-UTRAN radio fingerprint based on the obtained signal propagation time measurement value. In addition, the arrangement also comprises a transmitting unit. The transmitting unit is adapted to transmit the generated E-UTRAN radio fingerprint to the positioning node. Also, the arrangement further yet comprises a receiving unit. The receiving unit is adapted to receive geographic region data, associated with the location point of the user equipment.

Thanks to the measurement of the signal propagation time, measured with respect to the location point of the user equipment, an appropriate and unique Evolved Universal Terrestrial Radio Access Network, E-UTRAN, radio fingerprint may be generated with a minimum of overhead signalling involved. Thereby an improved mechanism for geographic position determination in a wireless communication system is provided.

BRIEF DESCRIPTION OF THE DRAWINGS

The present invention will now be described more in detail in relation to the enclosed drawings, in which.

DETAILED DESCRIPTION

The invention is defined as a method and an arrangement in a positioning node and as a method and an arrangement in a user equipment, which may be put into practice in the embodiments described below. This invention may, however, be embodied in many different forms and should not be considered as limited to the embodiments set forth herein; rather, these embodiments are provided so that this disclosure will be thorough and complete, and will fully convey the scope of the invention to those skilled in the art. It should be understood that there is no intent to limit the present method and arrangement in a positioning node and the method and arrangement in a user equipment to any of the particular forms disclosed, but on the contrary, the present method and arrangement in a positioning node and the present method and arrangement in a user equipment is to cover all modifications, equivalents, and alternatives falling within the scope of the invention as defined by the claims.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

Figure 1:
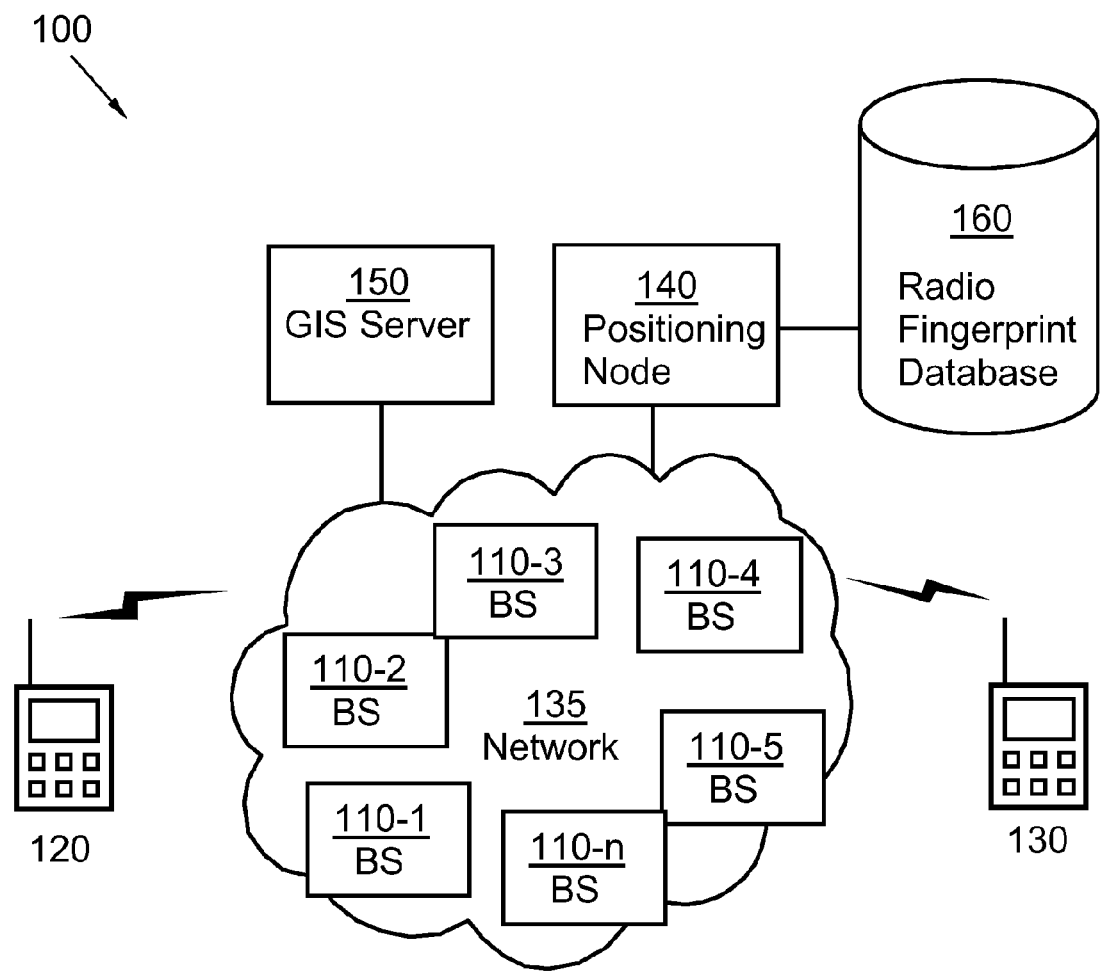
FIG. 1 is a schematic block diagram illustrating a wireless communication system according to some embodiments.

FIG. 1 is a schematic block diagram illustrating an exemplary wireless communication system 100, according to some embodiments. The wireless communication system 100 comprises a first node 110, a second node 120, 130, a positioning node 140 and a Geographic Information System (GIS) server 150 connected to a network 135.

The first node 110 may also be referred to as e.g. a base station, an access point, a Node B, an evolved Node B (eNode B) and/or a base transceiver station, Access Point Base Station, base station router, etc depending e.g. of the radio access technology and terminology used. In the rest of the description, the term "base station" will be used for the first node 110, in order to facilitate the comprehension of the present methods and arrangements.

The second node 120, 130 may be represented by e.g. a user equipment, a wireless communication terminal, a mobile cellular telephone, a Personal Communications Systems terminal, a Personal Digital Assistant (PDA), a laptop, a computer or any other kind of device capable of managing radio resources may communicate wirelessly with the base station 110 within the network 135. A Personal Communication System terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. One or more of the second node 120, 130 may be referred to as a "pervasive computing" device. In some implementations, the second node 120, 130 may be represented by a telephone that is connected to a Public Switched Telephone Network. However, in the rest of the description, the term "user equipment" will consistently be used for the second node 120, 130 in order to facilitate the comprehension of the present methods and arrangements.

The user equipment 120 may communicate with another user equipment 130, or with other devices not shown, via the network 135 in the wireless communication system 100.

In one implementation, the user equipment 120 may communicate with the user equipment 130 via one or more other nodes that act as intermediate devices between user equipment 120 and user equipment 130. For example, as shown in FIG. 1, a base station 110-1, which may include wireless base station functionality, may reside as an intermediate component of the network 135 that may be used to facilitate end-to-end communication between the user equipments 120 and 130 or between the user equipments 120, 130 and the positioning node 140 or GIS server 150. Additional base stations 110-2 through 110-N may be comprised within the network 135.

The base stations 110-1 through 110-N may interface with respective user equipments 120, 130, e.g., base station 110-1 may interface with user equipment 120, via respective wireless links and may perform, among other functions, Medium Access Control (MAC) and Radio Link Control (RLC).

The positioning node 140 may determine the location of user equipments 120, 130 in the system 100. The positioning node 140 may be associated with a radio fingerprint database 160 that stores radio fingerprints derived from Evolved Universal Terrestrial Radio Access Network (E-UTRAN) and/or inter-Radio Access Technology (IRAT) measurement data. The database 160 may reside internal or external to the positioning node 140 and may according to some embodiments be remotely connected to the positioning node 140. The E-UTRAN and/or IRAT measurement data may be provided to the positioning node 140, in conjunction with precise geographic position data obtained at the same geographic location at which the E-UTRAN and/or IRAT measurements were performed, e.g., GPS geographic position data. Also, the positioning node 140 may organize the precise geographic position data into clusters having a same or similar radio fingerprint. The positioning node 140 may further determine the cluster boundaries of each cluster and store the cluster boundary information, associated radio fingerprints, and precise geographic position data in the radio fingerprint database 160. The positioning node 140 may subsequently receive E-UTRAN and/or IRAT radio fingerprint measurement data from the user equipment 120 and/or user equipment 130 and may perform a lookup into the radio fingerprint database 160 to identify a radio fingerprint stored in the database 160 that matches the received E-UTRAN and/or IRAT radio fingerprint measurement data, and to retrieve a precise geographic position stored in the database 160 that corresponds to the matching radio fingerprint. More preferably, according to some embodiments, the cluster boundary information associated with the radio fingerprint may be retrieved. The positioning node 140 may provide this geographic position data/cluster boundary information to the user equipment 120, 130 that sent the radio fingerprint measurement data, or to other destinations, such as, for example, an emergency or police call centre.

The GIS server 150 may comprise one or more server entities that provide geographic mapping services, or related mapping services. The GIS server 150 may receive geographic position data concerning the user equipment 120, 130 from the positioning node 140, or from the user equipment 120, 130, and may map the received geographic position data to physical coordinates or a physical address, or perform other mapping related services with the geographic position data.

The network 135 may include one or more networks of any type, including a Local Area Network (LAN); a Wide Area Network (WAN); a Metropolitan Area Network (MAN); a telephone network, such as a Public Switched Telephone Network (PSTN) or a Public Land Mobile Network (PLMN); a satellite network; an intranet, the Internet; or a combination of these or other networks. The PLMN may further include a packet-switched sub-network, such as, for example, General Packet Radio Service (GPRS), Cellular Digital Packet Data (CDPD), or Mobile IP network.

The radio access technologies used for wireless communication within the wireless communication system 100 may further comprise technologies such as e.g. Code division multiple access (CDMA), Wideband Code Division Multiple Access (WCDMA), CDMA 2000, High Speed Downlink Packet Data Access (HSDPA), High Data Rate (HDR) etc, just to mention a few examples.

As used herein, the wireless communication system 100 may refer to various radio access technologies without departing from the teachings of the present invention. These radio access technologies may include, for example, radio access technologies, such as Long Term Evolution (LTE), Enhanced Data rates for GSM Evolution (EDGE), General Packet Radio Service (GPRS), Global System for Mobile Telecommunications (GSM), High Speed Packet Data Access (HSPA), Universal Mobile Telecommunications System (UMTS) and/or Wireless Local Area Networks (WLAN), such as Wireless Fidelity (WiFi) and Worldwide Interoperability for Microwave Access (WiMAX), Bluetooth or according to any other wireless communication standard.

It will be appreciated that the number of components illustrated in FIG. 1 is purely exemplary. Other configurations with more, fewer, or a different arrangement of components may be implemented. Moreover, in some embodiments, one or more components in FIG. 1 may perform one or more of the tasks described as being performed by one or more other components in FIG. 1.

Figure 2:
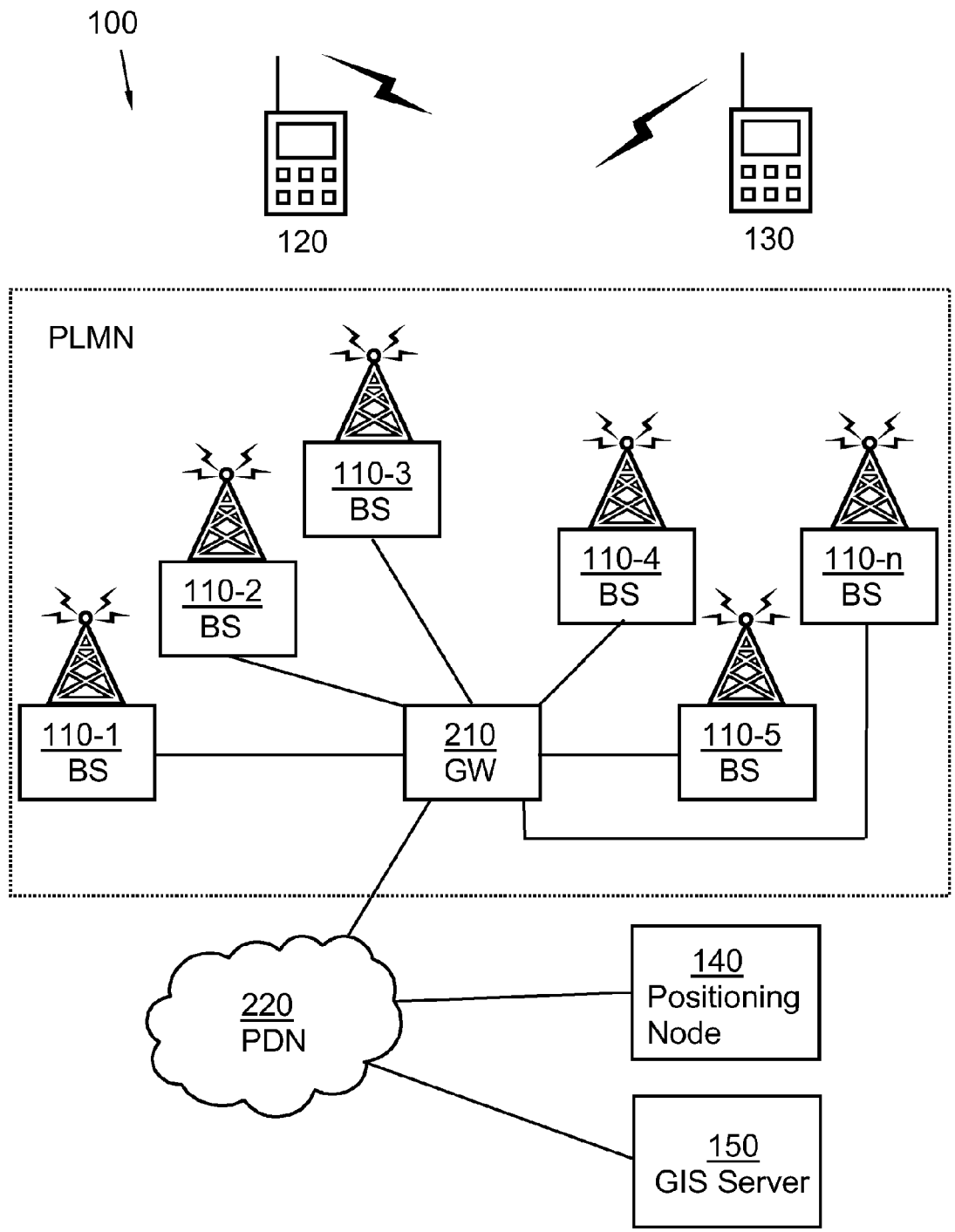
FIG. 2 is a schematic block diagram illustrating a wireless communication system according to some embodiments.

FIG. 2 illustrates an example of system 100 of FIG. 1, where the wireless communication system 100 comprises a PLMN. The PLMN may implement a Long Term Evolution (LTE) system architecture. As shown in FIG. 2, the user equipment 120, 130 may comprise cellular radiotelephones that are communicating with one another via the PLMN. The PLMN may include multiple base stations 110-1 through 110-N along with their associated antenna arrays and one or more gateways (GW) 210. The gateway 210 may further connect to a Packet Data Network (PDN) 220 of the wireless communication system 100 which may further connect to the positioning node 140 and the GIS server 150. The PDN 220 may include any type of packet-switched network, such as, for example, the Internet.

The base stations 110-1 through 110-N may interface with respective user equipments 120, 130, e.g., base station 110-1 may interface with the user equipment 120 via respective wireless links and may perform, among other functions, Medium Access Control (MAC) and Radio Link Control (RLC). For example, base station 110-1 may receive data transmissions from the user equipment 120 and may forward those data transmissions on to the gateway 210. The gateway 210 may route data transmissions received from a respective base station 110 to another base station 110, or to positioning node 140 or GIS server 150 via PDN 220. The gateway 210 may further route data transmissions received from positioning node 140 or GIS server 150 via PDN 220 to a respective base station 110-1 through 110-N associated with a destination user equipment 120, 130. Though positioning node 140 is shown in FIG. 2 as connected to the PLMN by way of PDN 220, in other implementations, positioning node 140 may reside as a component of PLMN, e.g. connected internally to the PLMN without messaging having to traverse PDN 220.

Figure 3:
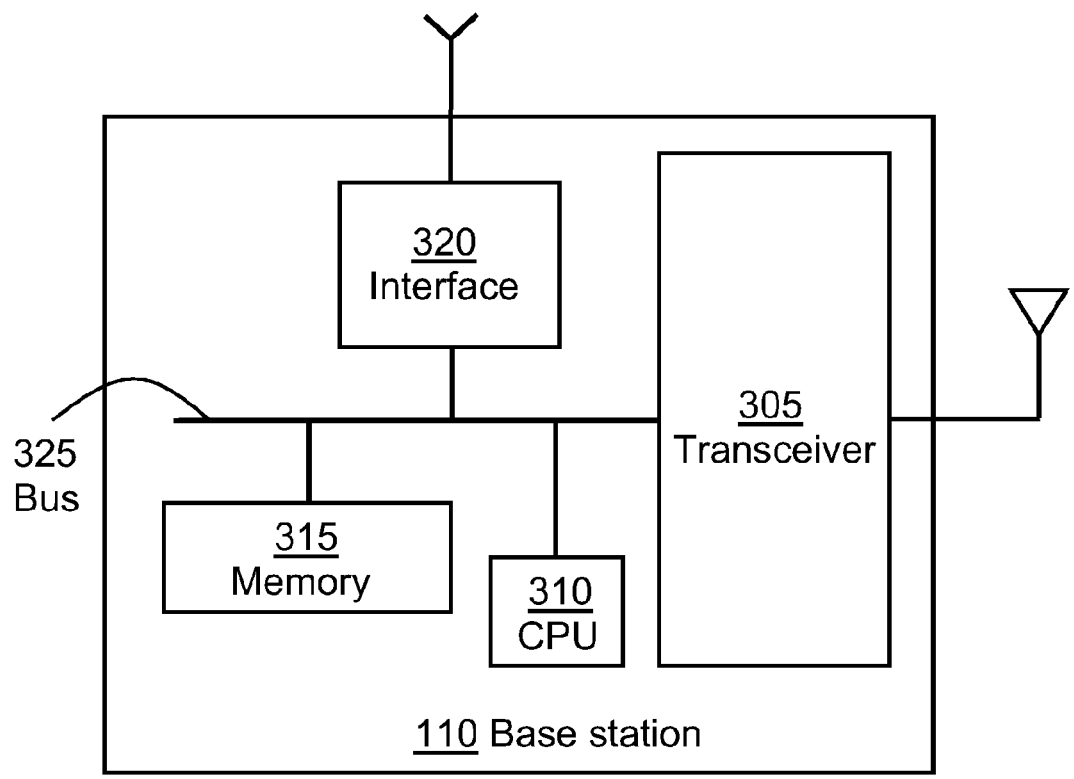
FIG. 3 is a schematic block diagram illustrating exemplary components of a base station according to some embodiments.

FIG. 3 illustrates one exemplary implementation of the base station 110-1. Base stations 110-2 through 110-N may be similarly configured. The positioning node 140 and the GIS server 150 may also be similarly configured; however, the positioning node 140 and the GIS server 150 may not comprise the transceiver 305, according to some embodiments. The base station 110-1 may comprise e.g. a transceiver 305, a processing unit 310, a memory 315, an interface 320 and a bus 325.

Transceiver 305 may include transceiver circuitry for transmitting and/or receiving symbol sequences using radio frequency signals via one or more antennas. The one or more antennas may include a single antenna or an antenna array and may include directional and/or omni-directional antennas. The transceiver 305 may additionally comprise measurement circuitry that may perform one or more of various different Evolved Universal Terrestrial Radio Access Network (E-UTRAN) radio fingerprint measurements, such as, for example, measuring the Evolved Universal Terrestrial Radio Access (E-UTRA) Downlink Reference Signal (DL RS) transmit power at the base station 110-1.

The processing unit 310 may comprise a processor, microprocessor, or processing logic that may interpret and execute instructions. Further, the processing unit 310 may perform all data processing functions for the base station 110-1. The memory 315 may provide permanent, semi-permanent, or temporary working storage of data and instructions for use by the processing unit 310 in performing device processing functions. Also, the memory 315 may be a primary storage memory unit such as a processor register, a cache memory, a Random Access Memory (RAM) or similar. The memory unit 315 may however in some embodiments be a secondary memory unit such as a Read Only Memory (ROM), Electrically Erasable Programmable Read-Only Memory (EEPROM), programmable read-only memory (PROM) or erasable programmable read-only memory (EPROM) or a hard disk drive. The memory unit 315 may however in some embodiments be an off-line storage memory unit, a flash memory, a USB memory or a memory card. The memory unit 315 may further in some embodiments be a Network-attached storage (NAS) or in fact any other appropriate medium such as and/or optical recording medium and its corresponding drive, or any other disk, tape or media that can hold machine readable data.

The interface 320 may include circuitry for interfacing with a link that connects to gateway 210. The bus 325 may interconnect the various components of the base station 110-1 to permit the components to communicate with one another.

The configuration of components of the base station 110-1 illustrated in FIG. 3 is for illustrative purposes only. Other configurations with more, fewer, or a different arrangement of components may be implemented.

Figure 4A:
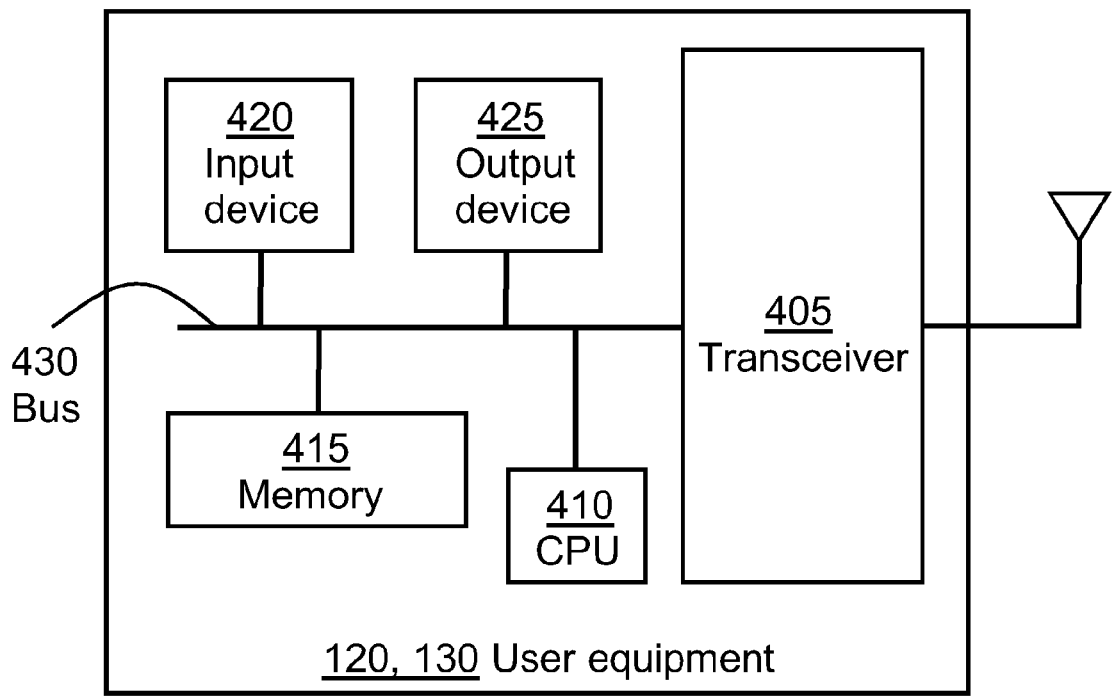
FIG. 4A is a schematic block diagram illustrating exemplary components of a user equipment according to some embodiments.

FIG. 4A illustrates the user equipment 120 consistent with an exemplary embodiment. The user equipment 130 may be similarly configured. The user equipment 120 may comprise a transceiver 405, a processing unit 410, a memory 415, an input device 420, an output device 425, and a bus 430.

The transceiver 405 may comprise transceiver circuitry for transmitting and/or receiving symbol sequences using radio frequency signals via one or more antennas. The transceiver 405 may comprise, for example, a RAKE or a GRAKE receiver. The transceiver 405 may additionally include measurement circuitry that may perform one or more of various different E-UTRAN radio fingerprint measurements, including now existing E-UTRAN measurements, based on e.g. one or more of the following: signal propagation time measurement value, signal propagation delay value, Round Trip Time measurement, E-UTRA Reference Signal Received Power (RSRP); E-UTRA Carrier Received Signal Strength Indicator, (E-UTRA carrier RSSI); E-UTRA Reference Signal Received Quality (RSRQ).

The processing unit 410 may comprise a Central Processing Unit (CPU), processor, microprocessor, or processing logic that may interpret and execute instructions. The processing unit 410 may perform all data processing functions for inputting, outputting, and/or processing of data including data buffering and device control functions, such as call processing control, user interface control, or the like.

The memory 415 may provide permanent, semi-permanent, or temporary working storage of data and instructions for use by the processing unit 410 in performing device processing functions. The memory 415 may comprise ROM, RAM, large-capacity storage devices, such as a magnetic and/or optical recording medium and its corresponding drive, and/or other types of memory units. The input device 420 may comprise mechanisms for entry of data into the user equipment 120, 130. The key pad may permit manual user entry of data into the user equipment 120, 130. The microphone may comprise mechanisms for converting auditory input into electrical signals. The display unit may comprise a screen display that may provide a user interface, e.g., a graphical user interface that can be used by a user for selecting device functions. The screen display of the display unit may comprise any type of visual display, such as, for example, a Liquid Crystal Display (LCD), a plasma screen display, a Light-Emitting Diode (LED) display, a Cathode Ray Tube (CRT) display, an Organic Light-Emitting Diode (OLED) display, etc.

The output device 425 may comprise mechanisms for outputting data in audio, video and/or hard copy format. For example, the output device 425 may comprise a speaker (not shown) that includes mechanisms for converting electrical signals into auditory output. The output device 425 may further comprise a display unit that displays output data to the user. For example, the display unit may provide a graphical user interface that displays output data to the user. The bus 430 may interconnect the various components of the user equipment 120 to permit the components to communicate with one another.

The configuration of components of the user equipment 120 illustrated in FIG. 4A is for illustrative purposes only. Other configurations with more, fewer, or a different arrangement of components may be implemented. For example, in some implementations, the user equipment 120, 130 may comprise a GPS position measuring device.

Figure 4B:
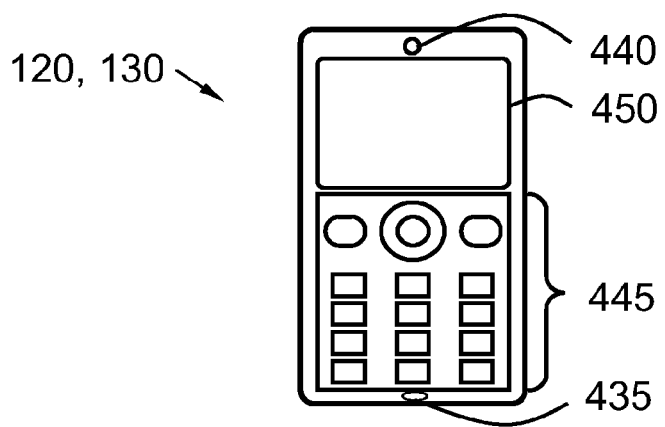
FIG. 4B is a schematic block diagram illustrating a user equipment according to some embodiments where the user equipment is embodied as a cellular telephone.

FIG. 4B illustrates an exemplary implementation of the user equipment 120 in which the user equipment 120 comprises a cellular radiotelephone. As shown in FIG. 4B, the user equipment 120 may comprise a microphone 435, e.g., of input device 420 for entering audio information into the user equipment 120, a speaker 440, e.g., of output device 425 for providing an audio output from the radiotelephone, a keypad 445, e.g., of input device 420 for manual entry of data or selection of telephone functions, and a display 450, e.g., of input device 420 or output device 425 that may visually display data to the user and/or which may provide a user interface that the user may use to enter data or to select telephone functions, in conjunction with keypad 445.

Figure 5A:
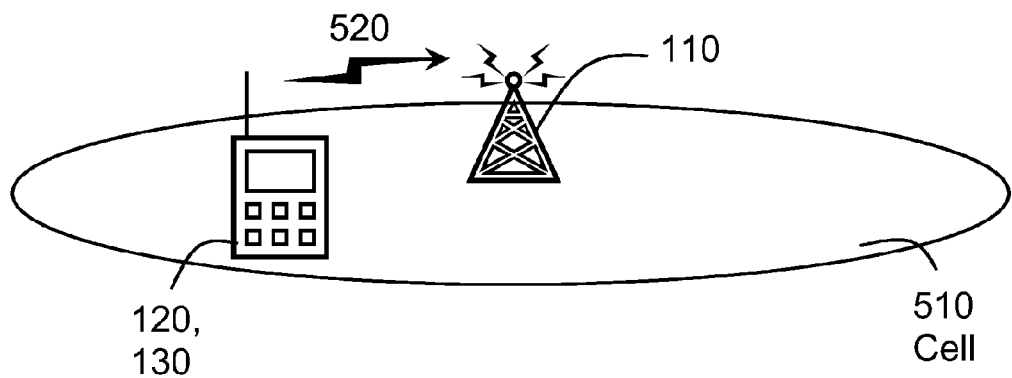
FIG. 5A is a schematic block diagram depicting the uplink transmission of Evolved Universal Terrestrial Radio Access Network (E-UTRAN) radio fingerprint from a user equipment to a base station in a cell in a wireless communication network.

FIG. 5A is a diagram that depicts the uplink transmission of E-UTRAN radio fingerprint measurement data from the user equipment 120 to base station 110-1 in a cell 510 of a wireless network 135. The user equipment 120 may, at a certain location point in cell 510, perform one or more E-UTRA and/or inter-RAT (IRAT) measurements and may send the results of those measurements as E-UTRAN radio fingerprint measurement data 520 to base station 110-1. The E-UTRAN radio fingerprint measurement data 520 may be based on one or more of the following measurements, including now existing E-UTRAN measurements: signal propagation time measurement value, signal propagation delay value, Round Trip Time measurement, Rx-Tx time difference measurement, E-UTRA reference signal received power (RSRP) measured at the user equipment 120, E-UTRA carrier RSSI measured at the user equipment 120, E-UTRA RSRQ measured at the user equipment 120.

In other embodiments, E-UTRAN radio fingerprint measurement data 520 may comprise additional or alternative measurements. Upon receipt of E-UTRAN radio fingerprint measurement data 520 by base station 110-1, base station 110-1 may forward data 520 on to positioning node 140 via e.g. the gateway 210 and PDN 220 for a geographic position determination based on radio fingerprint measurement data 520.

Figure 5B:
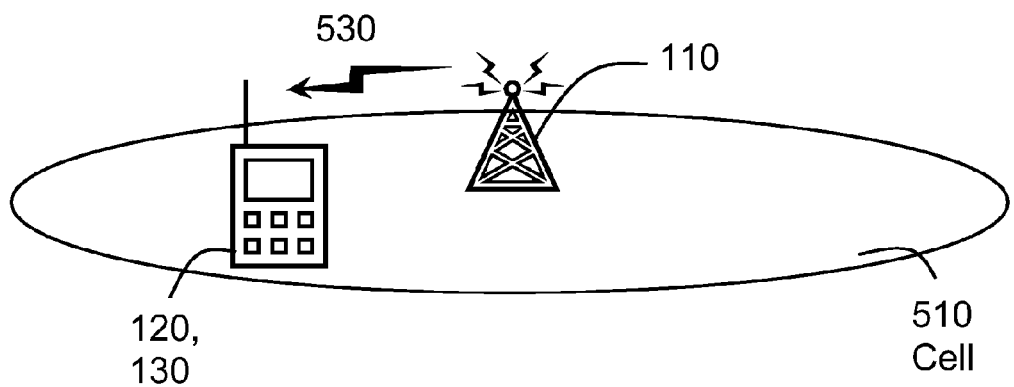
FIG. 5B is a schematic block diagram depicting the downlink transmission of the user equipment's geographical position from the base station in a cell in a wireless communication network, after the performance of a radio fingerprint look-up at a positioning node.

FIG. 5B is a diagram that depicts the downlink transmission of the user equipment 120's geographic position 530 from base station 110-1 to the user equipment 120 in the cell 510 after the performance of a radio fingerprint look-up at the positioning node 140. base station 110-1 may receive the geographic position data 530 from positioning node 140, via PDN 220 and the gateway 210, and may then transmit it on the downlink to the user equipment 120. The geographic position data 530 may comprise an accurate position of the user equipment 120 obtained by positioning node 140 based on measurement data 520 of FIG. 5A. The geographic position data 530 may comprise, for example, latitude/longitude coordinates, GPS coordinates, a physical address, etc.

Figure 6:
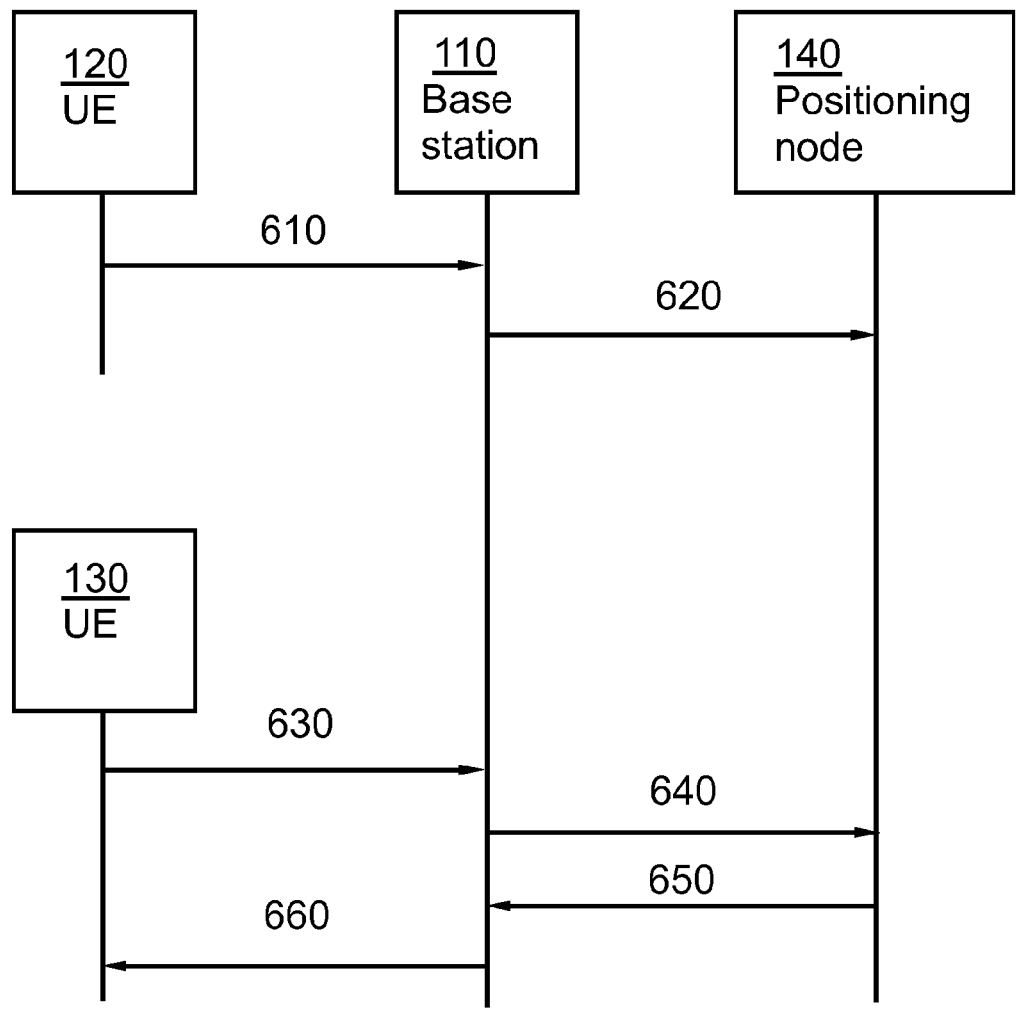
FIG. 6 is a combined flow chart and block diagram illustrating an embodiment of the present solution.

FIG. 6 is a messaging diagram that depicts at least some transmission of E-UTRAN radio fingerprint measurement data from the first user equipment 120 to the base station 110, and from the base station 110 to the positioning node 140. Also, a determination of the geographic position of the second user equipment 130 is performed by computing and transmitting E-UTRAN radio fingerprint measurement data from the second user equipment 130 to the base station 110 and from the base station 110 to the positioning node 140. However, it is to be noted that the illustrated signalling is merely an example of the signalling in a wireless communication system 100 according to the present solution. The signalling may comprise also further signalling as well as signalling with other nodes, not illustrated in FIG. 6.

The positioning node 140 performs a matching against the previously received E-UTRAN radio fingerprint measurement data and if a match is found, the therewith associated geographic position data is transmitted to the base station 110 and further to the user equipment 130. The user equipment 120 performs one or more radio fingerprint measurements; e.g., one or more of the types of measurements described above, and send the computed E-UTRAN radio fingerprint measurement data 610 to the base station 110. The base station 110 may perform one or more additional radio fingerprint measurements, such as e.g., E-UTRA DL RS power, and may add those additional measurements to the radio fingerprint 610 received from user equipment 120, and may then send E-UTRAN radio fingerprint measurement data 620 to the positioning node 140 which fingerprint 620 may be based on radio fingerprint measurements performed both at the user equipment 130 and/or the base station 110.

Also geographic position data associated with the location point of the first user equipment 120 may be transmitted to the base station 110 and forwarded to the positioning node 140.

The obtained radio fingerprint measurement 620 may be associated with the received geographic position data and e.g. stored in a radio fingerprint database 160. Further, the radio fingerprint measurement 620 and the associated the received geographic position data may be associated with a geographic region data.

When the second user equipment 130 want to determine the geographical position, or maybe rather, determine which geographic region the second user equipment 130 at present is situated in, a radio fingerprint measurement may be performed and sent 630 to the base station 110. The base station 110 may add additional measurements to the radio fingerprint and send 640 the radio fingerprint to the positioning node 140. The positioning node 140 may perform a radio fingerprint lookup to obtain the user equipment's 130 geographic region data, and then may send a message 650 that comprises the determined geographic region data to the base station 110. The base station 110 may receive the message 650 and forward it 660 on to the user equipment 130. Other entities may send a location request to the positioning node 140 to request a geographic region associated with one or more specific user equipments 130, and the positioning node 140 may return geographic region data that corresponds to the last reported position of the one or more specific user equipment 130.

The lookup into the radio fingerprint database 160 may comprise matching the obtained radio fingerprint measurement with previously stored radio fingerprint measurements stored in the database 160. The geographic region data stored in the database 160, that corresponds to matching radio fingerprint measurements, may be retrieved as the user equipment's 130 geographic position. The positioning node 140 may send this retrieved geographic region data to the user equipment 130 from which the E-UTRAN radio fingerprint data was received, or to other nodes external to the PLMN such as e.g., to GIS server 150, an emergency or police call centre, etc.

According to some embodiments, the positioning node 140 may perform a radio fingerprint lookup to obtain the user equipment's 130 geographic region data, and then may send a message that comprises the determined geographic region data to the GIS server 150. The GIS server 150 may map the geographic region data to physical coordinates or a physical address, or perform other mapping related services with the geographic position.

In additional examples of E-UTRAN radio fingerprint messaging, the E-UTRAN radio fingerprint measurement data may be sent from the user equipment 120, 130 to the base station 110 that is serving the user equipment 120, 130 and then on to another base station that is serving another cell in the PLMN. The base station 110 may signal the radio fingerprint measurement data to the other base station via, for example, an X2 interface. Thus, E-UTRAN radio fingerprint measurements may be performed at the user equipment 120, 130, and the measurement data may be incorporated into an E-UTRAN radio fingerprint measurement data message. The message may be sent from the user equipment 120, 130 to the base station 110, which is currently serving the user equipment 120, 130. The base station 110 may perform one or more additional radio fingerprint measurements such as e.g., E-UTRA DL RS power, may add those measurements to the measurement data received from user equipment 120, 130, and may then send an E-UTRAN radio fingerprint measurement data message on to the base station 110.

According to further embodiments, E-UTRAN radio fingerprint measurement data may be sent from the user equipment 120, 130 to the GIS server 150. The user equipment 120, 130 may signal the radio fingerprint measurement data to GIS server 150 via a Secure User Plane Location (SUPL)-type interface. The E-UTRAN radio fingerprint measurements may be performed at the user equipment 120, 130 and the measurement data may be incorporated into an E-UTRAN radio fingerprint measurement data message. The message may be sent from user equipment 120, 130 to the base station 110, which is currently serving the user equipment 120, 130. The base station 110 may perform one or more additional radio fingerprint measurements such as e.g., E-UTRA DL RS power, and may add those measurements to the measurement data received from the user equipment 120, 130, and may then forward the E-UTRAN radio fingerprint measurement data message on to the GIS server 150. The GIS server 150 may use the radio fingerprint measurement data to build up mappings of cell IDs/network IDs tagged with accurate geographic positions.

According to some embodiments, the measurement formats may be embedded in a data stream of the user plane, using e.g. a Secure User Plane Location (SUPL)-type interface. Thus it is possible to access cell data, neighbour cell lists and the results of basic measurement information that is anyway available in the user equipment 120, 130. Also, according to some embodiments, the positioning may be based on GPS or Assisted GPS (A-GPS) availability in a sufficient number of user equipment 120, 130. Basically, when a GPS (A-GPS) positioning is performed, said interface may be exploited in order to report available position related information to a positioning node 140.

The so obtained GPS position, together with the associated fingerprint information render it possible to build up globally valid mappings of cell ID/Network ID tagged with globally valid and highly accurate positions. Furthermore, corresponding neighbour cell relations may be constructed.

According to some embodiments, the following measurements may also be embedded in the SUPL interface: signal propagation time measurement value, signal propagation delay value, Round Trip Time measurement, RX-TX time difference measurement, Reference Signal Received Power (RSRP), on LTE; E-UTRA Carrier RSSI, on LTE; Reference Signal Received Quality (RSRQ), on LTE. There is also a measurement that may be performed by the base station 110 that may be relevant namely: DL RS power.

According to some embodiments, the following measurements are extracted from the user equipment 120, 130: Reference Signal Received Power (RSRP), on LTE; E-UTRA Carrier RSSI, on LTE; Reference Signal Received Quality (RSRQ), on LTE.

Further, an ID associated with the base station 110 to which the measurement refers may be retrieved and used for fingerprinting purposes.

According to some embodiments, timing measurements may be performed in the user equipment 120, 130. The modulation scheme used in the downlink of LTE is OFDMA. Assuming an accurate enough synchronization, the received signal within the DFT receiver window is the circular convolution of the transmitted sequence and the impulse response of the wireless channel. The output signal of the frequency-domain correlator becomes:

$$z(n) = R_{xx}(n) \otimes h(n)$$

The symbol $\otimes$ denotes circular convolution and Rxx(n) is the periodic ACF of the transmitted signal x(n). The impulse response of the wireless channel is denoted h(n).

The above formula may be valid if the user equipment 120, 130 is already sufficiently synchronized to the downlink timing. If this is not the case, a two step procedure can be envisioned where in the first step good enough synchronization is achieved and in the second step above outlined frequency-domain filtering is applied. Good enough means here: within the cyclic prefix such that the signal within the DFT window is cyclic.

With a sequence x(n) possessing ideal periodic ACF properties, i.e. $R_{xx}(n) = \delta(n)$. Thus the above equation reduces to:

$$z(n) = h(n)$$

The output signal of the circular correlator is now an estimate of the wireless channel and the timing of the first path can be detected. In order to improve the quality of the estimate it is possible to average over multiple estimates of h(n), either obtained with the same type of x(n) or by different types of x(n) with ideal periodic ACF. The timing estimate is then based on the first path of the estimated impulse response.

The above formula is valid if $X_k$ where the DFT of x(n) is modulated on all subcarriers. In general this is not the case, e.g. the synchronization channel spans only a fraction of the system bandwidth, reference signal are only modulated on every K-th subcarriers, etc.

More generally assume that $X_k$ is of length N and is modulated onto every K-th subcarrier. The output signal of the OFDM demodulator becomes then:

$$Y_k = \begin{cases} X_l H_k, & k = k_0 + lK, l = 0, 1, K, N-1 \\ 0, & k \text{ otherwise} \end{cases}$$

After multiplying subcarriers $k = k_0 + lK, l = 0, 1, K, N-1$ with $X_k^*$ (assuming a sequence x(n) with perfect periodic ACF) the following is obtained:

$$Z_k = \begin{cases} H_k, & k = k_0 + lK, l = 0, 1, K, N-1 \\ 0, & k \text{ otherwise} \end{cases}$$

and after applying a length M IDFT the time-domain signal becomes:

$$z(n) = IDFT\{Z_k\}$$
$$= h(n) \otimes t(n), n = 0, 1, K, M-1$$

The sequence t(n) is the length M IDFT transform of the frequency-domain impulse train.

$$T_k = \delta_{k_0+lK}, l = 0, 1, K, N-1$$

and can be written as $$t(n) = \frac{1}{M}\exp\left(j\frac{\pi}{M}(KN - K + 2k_0)n\right)\frac{\sin\frac{\pi KNn}{M}}{\sin\frac{\pi Kn}{M}}$$

For the special case K=1, M=N this expression reduces to δ(n) and the result z(n)=h (n) is obtained.

According to some embodiments, the primary synchronization channel, i.e. only the 63 subcarriers in the centre are modulated. For the IDFT size, M=512 may be assumed, i.e. the obtained timing resulting corresponds to a 5 MHz LTE system. According to some embodiments, t(n) for a subcarrier allocation used for the reference signals in LTE, i.e. only every 6-th subcarrier within a bandwidth of 300 subcarriers may be modulated. Also here the IDFT size M=512 may be assumed.

In case that the sequence $X_k$ is not placed on consecutive subcarriers but only on every K-th one, as it may be the case for reference symbols, t(n) becomes impulse train like with sinc-like functions centred on each peak. The correlator output signal, which is the channel impulse response circular convolved with t(n), has a similar shape. This results in ambiguous timing estimates without additional knowledge. However, since the user equipment 120, 130 already roughly may be, within the cyclic prefix, synchronized, the timing estimate may become unambiguous again. In order to improve the obtained channel estimate, and thus the first peak which is used for timing estimation, subcarriers not modulated by the signal used to perform the measurement may be set to zero.

With a subcarrier bandwidth Δf the obtained signal z(n) spans duration of 1/Δf and is sampled M times, the sampling interval of the signal z(n) may become: ΔT=1/(M·Δf).

Another possibility may be to map the distributed subcarriers carrying the signal $Z_k$ to a localized block and feed this block of consecutive subcarriers into an IDFT device. Mapping the distributed subcarriers into a localized block corresponds essentially to down-sampling in frequency-domain or superposition of cyclic shifted versions of the time-domain signal. The obtained time-domain signal spans essentially 1/K-th of the signal period. With an IDFT size of M the sampling interval becomes ΔT=1/(M·K·Δf).

Synchronization signals and reference signals may be used to estimate the timing. However, also other signals having constant magnitude across subcarriers, such as e.g. QPSK modulated data channels or control channels, can be used for timing estimation according to some embodiments. After the signals have been successfully decoded the transmitted frequency-domain signal $X_k$ can be reconstructed. Since $X_k$ possesses a constant magnitude it has an ideal periodic ACF, if applied to all subcarriers, or otherwise previous analysis applies. In this case the function $T_k$ may be adapted to the subcarrier allocation of the used signal. In order to obtain a single sharp peak in the correlator output signal, the used signal may be preferable localized.

Timing measurements may however, according to some embodiments be performed in the base station. The modulation scheme used in the LTE uplink is based on SC-FDMA which can be modelled as DFT-precoded OFDM. Also here a cyclic prefix is applied and thus the analysis from the previous section also applies here. Signals used to estimate the channel and timing in the uplink may preferably have a constant magnitude across used subcarriers.

Data signals, which are applied to the DFT precoding, may therefore typically not be used since they are not flat in frequency domain. Random access signals, even though defined in time-domain and also applied to the DFT precoder, may be used since the special sequences used for random access ensure a constant magnitude across all subcarriers. Demodulation and sounding reference signals are directly injected into the OFDM modulator without precoding and may be used for channel and timing estimation. Demodulation reference signals are localized in LTE whereas sounding reference signals can either have localized or distributed subcarrier mapping.

In case of an OFDM based uplink all signals with constant amplitude across subcarriers, e.g. QPSK modulated data or control signals can be used for channel and timing estimation.

When measuring the Round Trip Time (RTT) for fingerprinting positioning in LTE, the 1st path may firstly be detected. The output signal z(n) of the circular correlator is fed into a comparator that outputs the first sample position $n_0$ where |z(n)| (or any other similar metric, e.g. $|z(n)|^2$) exceeds a certain threshold. Typically this threshold depends on the statistical properties of the noise at the comparator input. Assuming the first path occurs at sample $n_0$ the corresponding time becomes then $t_0 = n_0 \cdot \Delta T$.

In case the receiver is equipped with multiple antennas, a combiner unit incoherently (power) combines the signals $z_i(n)$ originating from the different receiver branches i prior peak detection.

When the Time of arrival time-difference between the 1st path of serving and target cell is computed, the difference between $t_{0,t}$ and $t_{0,s}$ is measured on signals of the same kind originating from the target and serving cell, respectively. $t_{0,t}$ and $t_{0,s}$ represent the receive times of first path of target and serving cell, respectively. This measurement may be performed at the user equipment 120, 130 and any of the signals outlined above for downlink measurements may be used for this purpose.

The Rx-Tx time-difference in the user equipment 120, 130 is the time difference between $t_{0,t}$ obtained from a specified signal and the beginning of a signal transmission in response to the received signal. This measurement may be performed at the user equipment 120, 130 and any of the signals outlined above for downlink measurements may be used for this purpose.

The base station Round Trip Time (RTT) is the time difference between $t_{0,t}$ obtained from a specified signal and beginning of signal transmissions at the base station that triggered this measurement. This measurement is performed at the base station 110 and any of the signals outlined above for uplink measurements can be used for this purpose.

The measurement results related to RTT for fingerprinting positioning in LTE may be sent between the base station 100 and the user equipment 120, 130.

According to some embodiments, the base station 110 (i.e. eNode B) measures and sends the measured RTT to the user equipment 120, 130, and/or to the positioning node 140. The Rx-TX measurement may, according to some embodiments, be signalled to the base station 110, followed by either forwarding to the positioning node 140 or correction of the RTT measurement before signalling to the positioning node 140. Thus e.g. the Rx-Tx time-difference in the user equipment 120, 130 may be subtracted from the RTT before sending it to the positioning node 140. Alternatively, according to other embodiments, the user equipment 120, 130 may perform the same signalling to the positioning node 140.

This is because in E-UTRAN all radio network functions reside in the base station 110, or the eNode B. The signalling to the user equipment 120, 130 enables the application of terminal based user plane RTT positioning methods employing fingerprinting. In this case the additional measurement of the alignment between the downlink and the uplink may be assumed to be performed in the user equipment 120, 130, according to some embodiments. In other embodiments, the base station 110 only measures the RTT to the user equipment 120, 130. The signalling from the user equipment 120, 130 in this case comprises the additional measurement of the alignment between the downlink and the uplink, which may be assumed to be performed in the user equipment 120, 130.

Further, it may in principle also be possible to interchange the location of the RTT and alignment between the base station 110 and the user equipment 120, 130.

The positioning node 140 may signal an obtained geographic position data to a receiving node. In particular it may be possible to report polygons with altitude and multiple positions per request.

Signalling Methods

The signalling methods are the means which allow reduction of signalling overheads but at the same time ensure that measurements are available when needed. They may therefore set optimum delivery of propagation delay or RTT to the user equipment 120, 130 and/or the positioning node 140. The signalling according to the present method may be based on any of the three principles periodical reporting, event triggered reporting or event triggered periodical reporting. These three report method principles will in the following be further explained in detail.

Periodical Reporting

The propagation delay or RTT is reported at regular interval when using periodical reporting. Typically the base station 110 will measure the one way propagation delay or RTT when the user equipment 120, 130 transmits PRACH or other channels in the uplink. But the base station 110 may also estimate the propagation delay or RTT during closed loop operation.

The determination of the reporting rate in periodical reporting may be based on various parameters such as e.g. the cell size, the change in position of the user equipment 120, 130 or the speed of the user equipment 120, 130. The reporting rate may also be a function of DRX cycle.

According to some embodiments, the network 135 may set some fixed periodic signalling rate, for instance depending upon the cell size. Thus in large cells 510 the signalling may be done more frequently assuming the user equipment 120, 130 will move faster and vice versa.

However, according to some embodiments, the reporting rate may be set as a function of change in position. According to these embodiments, the network 135 may adjust or modify the reporting rate depending upon the change in the position of the user equipment 120, 130 over the last monitoring duration. For instance if the user equipment 120, 130 has not changed position significantly over time then the signalling rate, i.e. signal the propagation delay, may be reduced. The network 135 may also perform double check by comparing the previously signalled and currently measured propagation delay or RTT samples. If the position of the user equipment 120, 130 has not changed significantly, then both measurement samples would be in the same range. However the opposite is not necessarily true. Although the position of the user equipment 120, 130 might have changed over time, the propagation delay or RTT might still be in the same range.

This approach may reduce signalling overheads while the user equipment 120, 130 positioning may still be tracked with required accuracy.

The reporting rate may, according to some embodiments be a function of the speed of the user equipment 120, 130. The network 135 may according to these embodiments adjust or modify the reporting rate depending upon the speed of the user equipment 120, 130. It may be assumed that the signalling concerning the propagation delay or RTT may be performed more frequently if the speed of the user equipment 120, 130 is high, as this implicates a change in geographical position.

According to some embodiments, the reporting rate may be a function of the DRX cycle. When DRX is in use the network 135 may at most signal the propagation delay or RTT to the user equipment 120, 130 once every DRX. Therefore, in DRX mode, which can be employed also in connected mode, the network 135 may with certain advantage adjust the periodical reporting rate as a function of DRX cycle.

Regardless of whether the DRX is in use or not, the base station 110 may perform one way propagation delay or RTT whenever uplink transmission occurs. Note that uplink transmission can take place independent of the DRX cycle. Therefore the network can signal the propagation delay to the positioning node 140 with any rate irrespective of the DRX cycle in operation.

Event Triggered Reporting

According to some embodiments, the propagation delay or RTT may be signalled in response to an event. The event may be e.g. after the measurement of the propagation delay or RTT or when the position change of the user equipment 120, 130 exceeds a certain threshold value.

The event may occur in the base station 110, which performs the one way propagation delay or RTT. In E-UTRAN this may be an internal event at the eNode B 110, which in turn may also configure the user equipment 120, 130 and the positioning node 140 for receiving the measurement according to the event.

According to some embodiments, the propagation delay or RTT may be sent to the user equipment 120, 130 and/or the positioning node 140 after the measurement of propagation delay or the RTT. According to this method the propagation delay or RTT may be sent whenever the base station 110 performs propagation delay or RTT measurement, especially while receiving PRACH or other unilateral control channel in the uplink.

According to some embodiments, the propagation delay or RTT may be sent to the user equipment 120, 130 and/or the positioning node 140 when the change in position of the user equipment 120, 130 exceeds a threshold value. The network 135 may according to these embodiments signal the propagation delay or RTT if it is detected that the position of the user equipment 120, 130 has changed beyond some threshold level. Similarly, if the position of the user equipment 120, 130 has not changed over a pre-determined time period, then the network 135 may not send any new value of the propagation delay or RTT, respectively. The network 135 may also perform double check by comparing the previously sent propagation delay or RTT and currently measured propagation delay/RTT samples. If the user equipment 120, 130 position has not changed significantly then both measurement samples may be expected to be found in the same range. However the opposite is not necessarily true. Thus, although the user equipment 120, 130 position might have changed over time, the propagation delay or RTT may still be in the same range.

Event Triggered Periodical Reporting

According to some embodiments, the reporting of the propagation delay or RTT may be performed periodically after the occurrence of some event. The triggering event may be e.g. when the change in propagation delay or RTT exceeds a certain threshold value, when the change of position of the user equipment 120, 130 exceeds a certain threshold value, when the user equipment 120, 130 speed exceeds a certain threshold value etc.

According to some embodiments, the reporting of the propagation delay or RTT is performed when the change in propagation delay or RTT exceeds a certain threshold limit value. According to this method if there is significant change in the propagation delay/RTT over a pre-determined time the network starts periodical reporting of the propagation delay/RTT. The network reverts to the event reporting if the change in the propagation delay/RTT falls below another certain threshold limit value over a pre-determined time.

According to some embodiments, the network 135 may start periodical reporting of the measured propagation delay or RTT when the change of position of the user equipment 120, 130 exceeds a certain threshold limit value. The threshold limit value may be predetermined and set e.g. by the network 135.

The network 135 may revert to the event reporting if the change in the user equipment 120, 130 position falls below another threshold, over a pre-determined time.

According to some embodiments, the network 135 may start periodical reporting of the propagation delay or RTT if the user equipment 120, 130 speed exceeds a certain threshold limit value over a pre-determined time. The network 135 may revert to the event reporting if the user equipment 120, 130 speed falls below another threshold limit value over a pre-determined time.

The user equipment 120, 130 speed may be determined in several ways. The speed of the user equipment 120, 130 may e.g. be tracked at the base station 110 by measuring the Doppler frequency of the user equipment 120, 130 under consideration.

The propagation delay or RTT can be reported in terms of number of chips in UTRAN and/or as a function of cyclic prefix in E-UTRAN. The normal and extended Control Plane (CP) lengths in E-UTRAN are in the order of 5 and 16 μs respectively. Since propagation delay can be very fine therefore in E-UTRAN, the reporting can still be done in terms of number of CP (N). However rules can be defined to derive the actual propagation delay ($D_p$). For instance:

$$D_p = 2^{k \times N}$$

Where N is an integer which can take any positive and negative value; k is a constant. Another possibility is to report it in the scale of nano or micro second.

According to some embodiments, the report of the absolute value of the propagation delay or RTT may be followed by several differential reports. The differential means the difference between the previous and current absolute propagation delays e.g. ΔN in case of E-UTRAN. One bit may be needed to indicate whether the reported quantity is absolute or differential.

Figure 7:
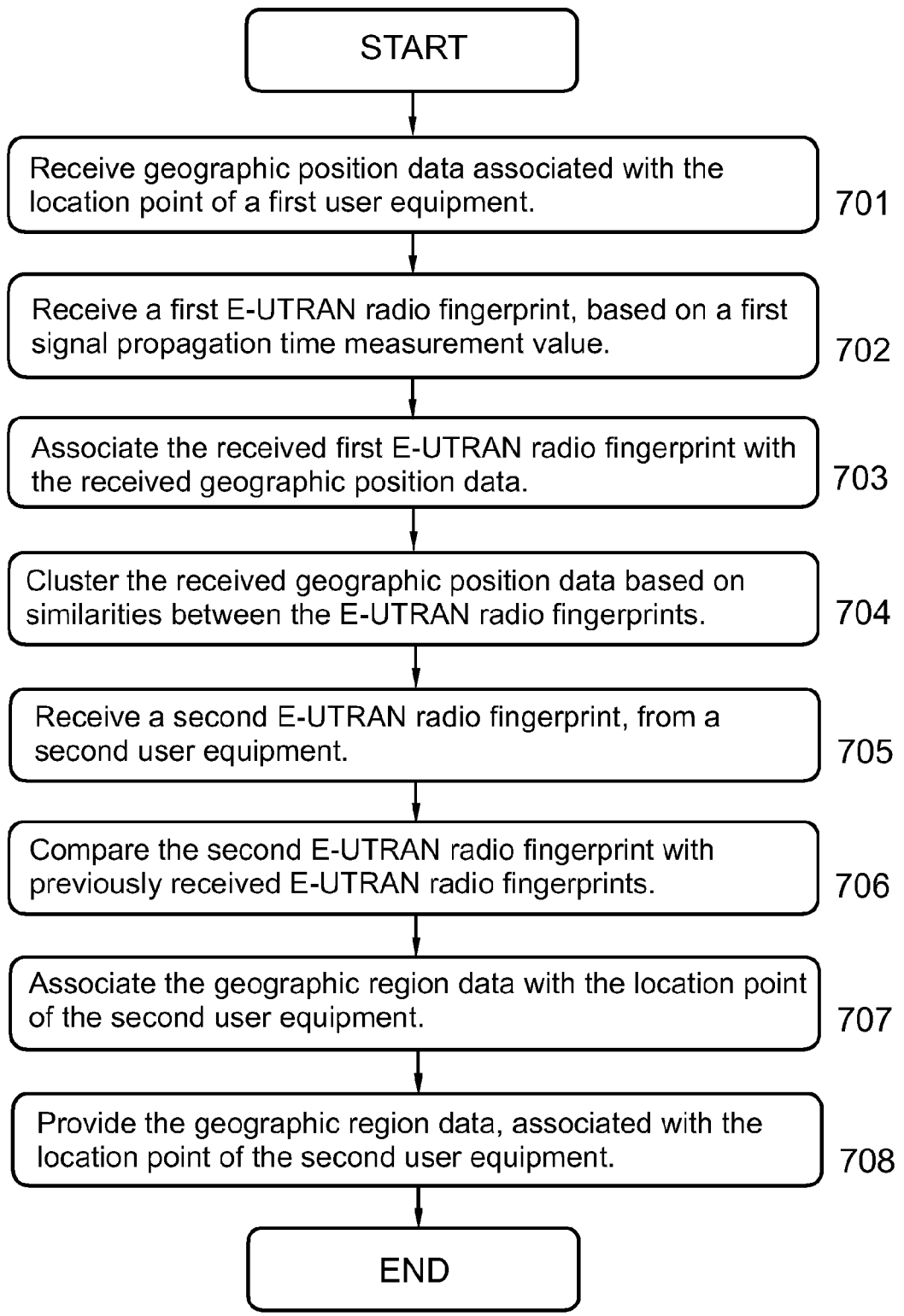
FIG. 7 is a schematic flow chart illustrating an embodiment of the present method in a positioning node according to some embodiments.

FIG. 7 is a flow chart illustrating a method in a positioning node 140, for providing geographic region data. The geographic region data comprises geographic position data. The positioning node 140 is comprised in a wireless communication system 100. The wireless communication system 100 may be e.g. E-UTRAN.

To appropriately provide geographic region data, the method may comprise a number of steps 701-708. It is however to be noted that some parts of the described method steps are optional and only comprised within some embodiments. Further, it is to be noted that the method steps 701-702 may be performed in any arbitrary chronological order and that step 701 and step 702, may be performed simultaneously or in an altered, arbitrarily rearranged, decomposed or even completely reversed chronological order. The method comprises the following steps:

Step 701

Geographic position data associated with the location point of a first user equipment 120 comprised in the wireless communication system 100, is received. This step 701 is repeated a multitude of times.

Thus the positioning node 140 receives different geographic position data associated with different location points of the first user equipment 120 repeatedly, a multitude of times. Thus different geographic position data associated with different location points of the first user equipment 120 may be received as the first user equipment 120 moves into different location points.

The geographic position data may be determined e.g. by a GPS unit comprised within the first user equipment 120.

Step 702

A first Evolved Universal Terrestrial Radio Access Network, E-UTRAN, radio fingerprint is received. The E-UTRAN radio fingerprint is based on a first signal propagation time measurement value. The first signal propagation time measurement value is measured with respect to the location point of the first user equipment 120. This step 702 is repeated a multitude of times.

Different E-UTRAN radio fingerprints, based on different signal propagation time measurement values, measured with respect to different location points of the first user equipment 120 are received, a multitude of times, e.g. as the first user equipment 120 moves into different location points.

According to some embodiments, the signal propagation time measurement value may be a signal propagation delay value of a signal sent from the user equipment 120 to a base station 110. The user equipment 120 and the base station 110 are comprised in the wireless communication system 100.

However, according to some embodiments, the signal propagation time measurement value may be a round trip time of a signal sent back and forth between the user equipment 120 and the base station 110.

According to some embodiments, the signal propagation time measurement value may be based on a circular correlator.

The E-UTRAN radio fingerprint may according to some embodiments be further based on one or more of the measurements: Evolved Universal Terrestrial Radio Access, E-UTRA, Reference Signal Received Power, RSRP, measured at the respective user equipment 120, E-UTRA Carrier Received Signal Strength Indicator, E-UTRA Carrier RSSI, measured at the respective user equipment 120, E-UTRA Reference Signal Received Quality, RSRQ, measured at the respective user equipment 120, or E-UTRA Downlink Reference Signal DLRS transmit power measured at the respective base station 110 associated with the respective user equipment 120.

Step 703

The received first E-UTRAN radio fingerprint is associated with the received geographic position data. This step 703 is repeated a multitude of times.

Thus as different geographic position data are received in step 701, and different E-UTRAN radio fingerprints are received in step 702, these are repeatedly associated with each other.

Step 704

The received geographic position data is clustered based on similarities between the received E-UTRAN radio fingerprint, to create cluster boundaries defining geographical region data, Step 705

A second E-UTRAN radio fingerprint is received. The second E-UTRAN radio fingerprint is based on a second signal propagation time measurement value. The second signal propagation time measurement value is measured with respect to the location point of a second user equipment 130, comprised in the wireless communication system 100.

According to some embodiments, the signal propagation time measurement value may be a signal propagation delay value of a signal sent from the second user equipment 130 to a base station 110. The second user equipment 130 and the base station 110 are comprised in the wireless communication system 100.

However, according to some embodiments, the signal propagation time measurement value may be a round trip time of a signal sent back and forth between the second user equipment 130 and the base station 110.

According to some embodiments, the signal propagation time measurement value may be based on a circular correlator.

The E-UTRAN radio fingerprint may according to some embodiments be further based on one or more of the measurements: Evolved Universal Terrestrial Radio Access, E-UTRA, Reference Signal Received Power, RSRP, measured at the respective user equipment 130, E-UTRA Carrier Received Signal Strength Indicator, E-UTRA Carrier RSSI, measured at the respective user equipment 130, E-UTRA Reference Signal Received Quality, RSRQ, measured at the respective user equipment 130, or E-UTRA Downlink Reference Signal DLRS transmit power measured at the respective base station 110 associated with the respective user equipment 130.

Step 706

The second E-UTRAN radio fingerprint received from the second user equipment 130 is compared with the previously received E-UTRAN radio fingerprints, which has previously been associated with geographic region data.

Step 707

If the second E-UTRAN radio fingerprint corresponds to a previously received E-UTRAN radio fingerprint, the geographic region data of the previously received E-UTRAN radio fingerprint is associated with the location point of the second user equipment 130.

Step 708

The geographic region data, associated with the location point of the second user equipment 130 is provided.

The geographic region data may according to some embodiments be sent to any of the following recipients: the second user equipment 130, any user equipment 120, 130, an emergency or police call centre, a Geographic Information System server 150, or a node external to the wireless system 100. The sending may be performed via an X2 or a Secure User Plane Location-type interface.

Figure 8:
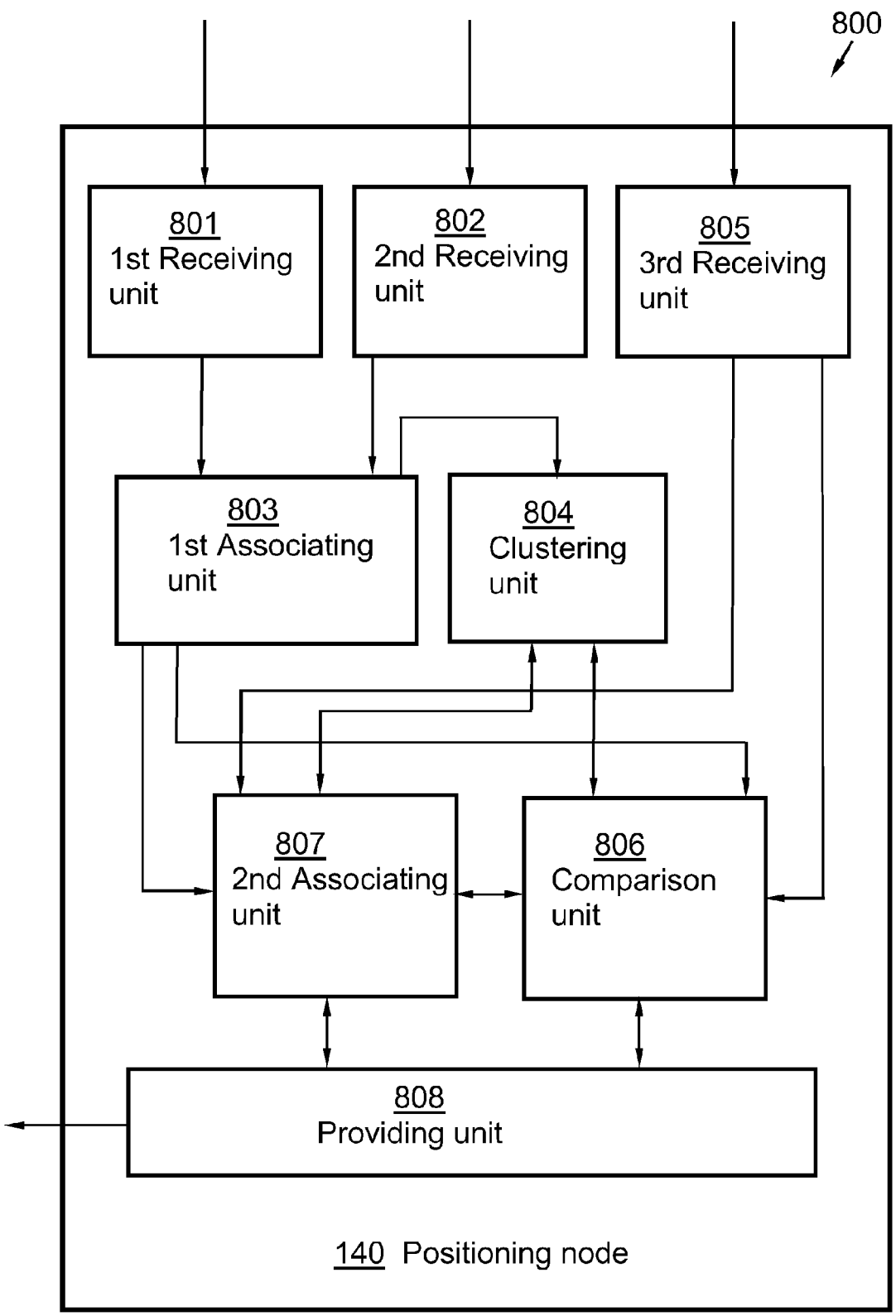
FIG. 8 is a schematic block diagram illustrating an arrangement in a positioning node according to some embodiments.

FIG. 8 schematically depicts an embodiment of an arrangement 800 in a positioning node 140. The arrangement 800 is configured to provide geographic region data. The geographic region data comprises geographic position data. The positioning node 140 is comprised in a wireless communication system 100.

The arrangement 800 comprises a first receiving unit 801. The first receiving unit 801 is adapted to receive geographic position data associated with the location point of a first user equipment 120 comprised in the wireless communication system 100. Further, the arrangement 800 comprises a second receiving unit 802. The second receiving unit 802 is adapted to receive a first Evolved Universal Terrestrial Radio Access Network (E-UTRAN) radio fingerprint, which first E-UTRAN radio fingerprint is based on a first signal propagation time measurement value measured with respect to the location point of the first user equipment 120. Also, the arrangement 800 comprises a first associating unit 803. The first associating unit 803 is adapted to associate the received first E-UTRAN radio fingerprint with the received geographic position data. Further yet, the arrangement 800 comprises a clustering unit 804. The clustering unit 804 is adapted to cluster the received geographic position data based on similarities between the received E-UTRAN radio fingerprint, in order to create cluster boundaries defining geographical region data. Still further, the arrangement 800 comprises a third receiving unit 805. The third receiving unit 805 is adapted to receive a second E-UTRAN radio fingerprint. The second E-UTRAN radio fingerprint is based on a second signal propagation time measurement value. The second signal propagation time measurement value is measured with respect to the location point of a second user equipment 130. The second user equipment 130 is comprised in the wireless communication system 100. In addition, the arrangement 800 further comprises a comparison unit 806. The comparison unit 806 is adapted compare the second E-UTRAN radio fingerprint, received from the second user equipment 130, with the first E-UTRAN radio fingerprint, previously received from the first user equipment 120. The first E-UTRAN radio fingerprint is associated with geographic region data. The arrangement 800 furthermore comprises a second associating unit 807. The second associating unit 807 is adapted to associate the geographic region data of the previously received E-UTRAN radio fingerprint with the location point of the second user equipment 130. Moreover, the arrangement 800 comprises a providing unit 808. The providing unit 808 is adapted to provide the geographic region data, associated with the location point of the second user equipment 130.

It is to be noted that any internal electronics of the positioning node 140 not completely necessary for performing the present method according to the method steps 701-708 has been omitted from FIG. 8, for clarity reasons. Further, it is to be noted that some of the described units 801-808 comprised within the arrangement 800 in the positioning node 140 are to be regarded as separate logical entities but not with necessity separate physical entities. To mention just one example, the first, second and third receiving units 801, 802 and 805 may be comprised or co-arranged within the same physical unit, e.g. together with the providing unit 808. According to some embodiments, any, some or all of the enumerated units 801, 802, 805 and 808 may be comprised within one physical unit, a transceiver, which may comprise a transmitter circuit and a receiver circuit, which respectively transmits outgoing radio frequency signals and receives incoming radio frequency signals via an antenna. The antenna may be an embedded antenna, a retractable antenna or any antenna known to those having skill in the art without departing from the scope of the present invention. The radio frequency signals transmitted between the user equipment 120, the base station 110 and the positioning node 140 may comprise both traffic and control signals e.g., paging signals/messages for incoming calls, which may be used to establish and maintain a voice call communication with another party or to transmit and/or receive data, such as SMS, e-mail or MMS messages, with a remote user equipment 130.

Figure 9:
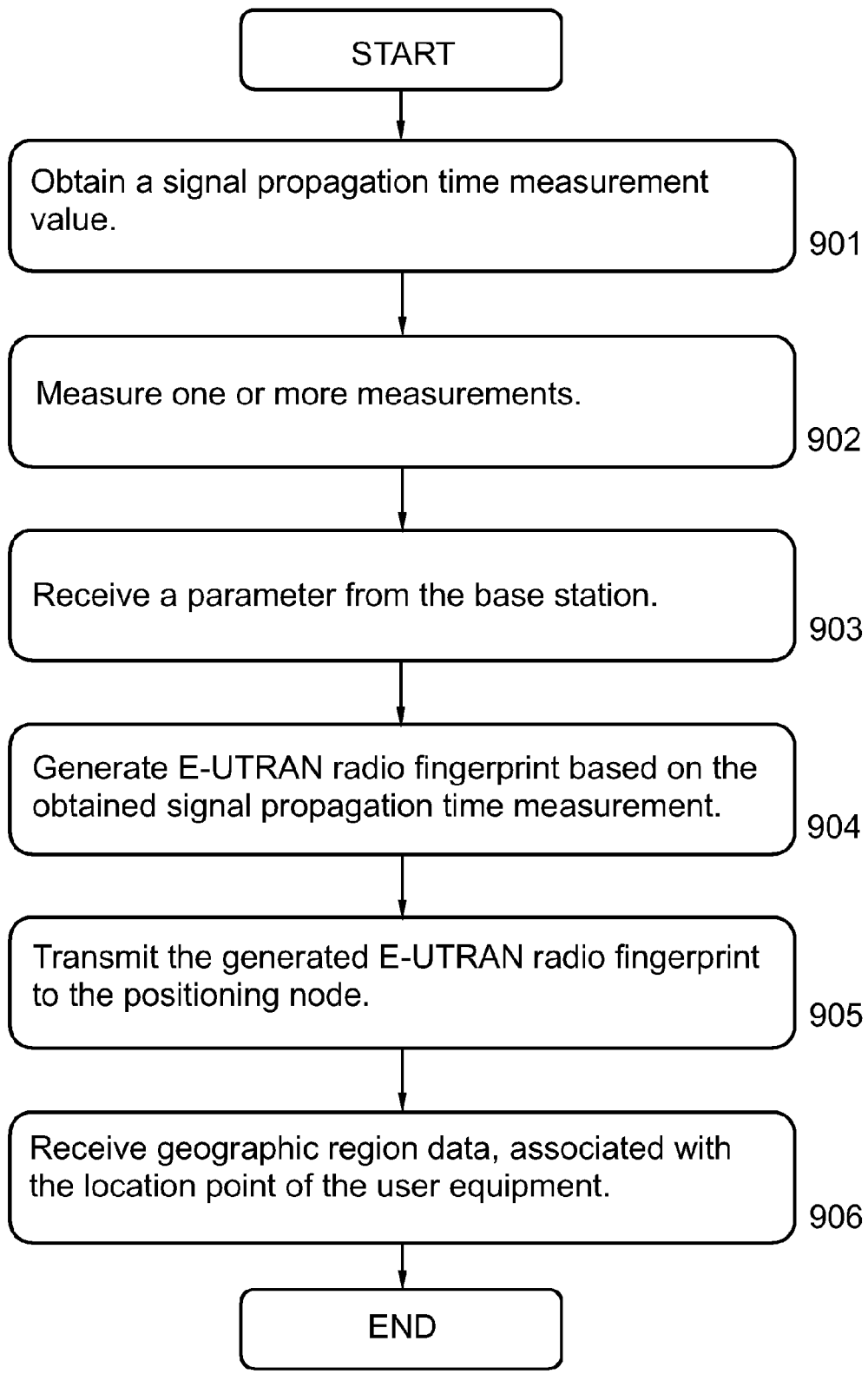
FIG. 9 is a schematic flow chart illustrating an embodiment of the present method in a user equipment according to some embodiments.

FIG. 9 is a flow chart illustrating a method in a user equipment 130, for retrieving geographic region data associated with the location point of the user equipment 130. The user equipment 130 is comprised in a wireless communication system 100. The wireless communication system 100 also comprises a positioning node 140.

To appropriately retrieve geographic region data, the method may comprise a number of steps 901-906. It is however to be noted that some method steps, partly or entirely are optional and only comprised within some embodiments. Further, it is to be noted that the method steps 901-906 may be performed in another chronological order than the enumeration indicates. As an example, the method step 901 and the optional method step 902 may be performed simultaneously or in an altered, arbitrarily rearranged, decomposed or even completely reversed chronological order. The method comprises the following steps:

Step 901

A signal propagation time measurement value is obtained.

Step 902

This method step is optional.

One or more of the measurements: Evolved Universal Terrestrial Radio Access, E-UTRA, Reference Signal Received Power, RSRP, E-UTRA Carrier Received Signal Strength Indicator, E-UTRA carrier RSSI and/or E-UTRA Reference Signal Received Quality, RSRQ may be measured according to some embodiments.

Step 903

This method step is optional.

The parameter E-UTRA Downlink Reference Signal, DLRS, transmit power measured at the base station 110, may according to some embodiments be received.

wherein the step of generating (904) an E-UTRAN radio fingerprint is further based on the received parameter.

Step 904

An Evolved Universal Terrestrial Radio Access Network, E-UTRAN, radio fingerprint is generated, based on the obtained signal propagation time measurement value.

According to some optional embodiments, the signal propagation time measurement value may be a signal propagation delay value of a signal sent from the user equipment 130 to a base station 110 comprised in the wireless communication system 100.

However, according to some optional embodiments, the signal propagation time measurement value may be a round trip time of a signal sent back and forth between the user equipment 130 and the base station 110.

The signal propagation time measurement value may, according to some embodiments, be based on a circular correlator.

According to some optional embodiments, the E-UTRAN radio fingerprint may be generated further based on one or more of the measurements: Evolved Universal Terrestrial Radio Access, E-UTRA, Reference Signal Received Power, RSRP, E-UTRA Carrier Received Signal Strength Indicator, E-UTRA carrier RSSI, E-UTRA Reference Signal Received Quality, RSRQ.

Further, according to some optional embodiments, the E-UTRAN radio fingerprint may be generated also based on the parameter E-UTRA Downlink Reference Signal, DLRS, transmit power measured at the base station 110.

Step 905

The generated E-UTRAN radio fingerprint is transmitted to the positioning node 140.

Step 906

Geographic region data, associated with the location point of the user equipment 130 is received.

Figure 10:
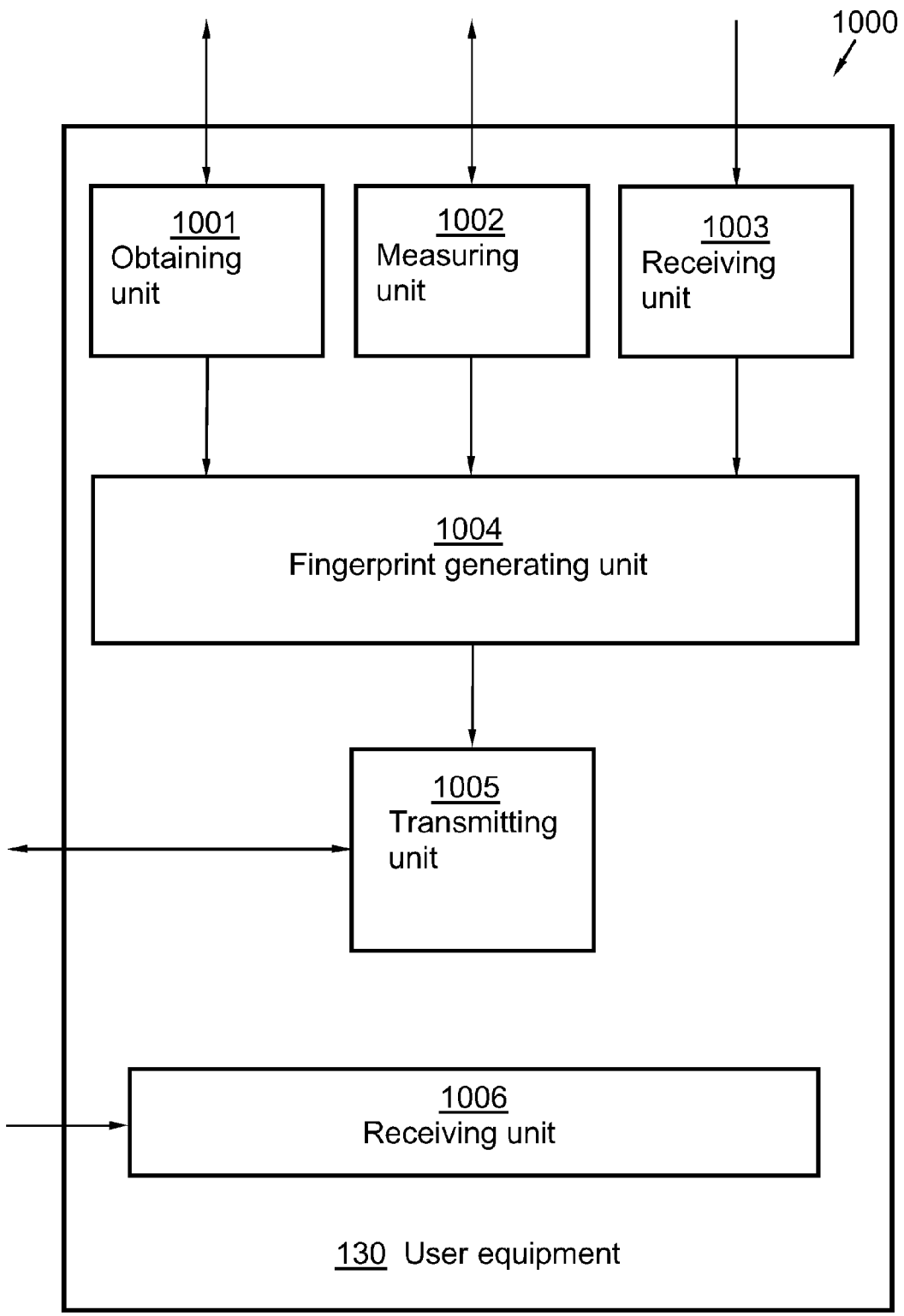
FIG. 10 is a schematic block diagram illustrating an arrangement in a user equipment according to some embodiments.

FIG. 10 schematically depicts an embodiment of an arrangement 1000 in a user equipment 130. The arrangement 1000 is configured to retrieve geographic region data associated with the location point of the user equipment 130. The geographic region data comprises geographic position data. The user equipment 130 is comprised in a wireless communication system 100. The wireless communication system 100 also comprises a positioning node 140.

The arrangement 1000 comprises an obtaining unit 1001. The obtaining unit 1001 is adapted to obtain a signal propagation time measurement value. Further, the arrangement 1000 comprises a fingerprint generating unit 1004. The fingerprint generating unit 1004 is adapted to generate an E-UTRAN radio fingerprint, based on the obtained signal propagation time measurement value. Also, the arrangement 1000 comprises a transmitting unit 1005. The transmitting unit 1005 is adapted to transmit the generated E-UTRAN radio fingerprint to the positioning node 140. Further yet, the arrangement 1000 comprises a receiving unit 1006. The receiving unit 1006 is adapted to receive geographic region data, associated with the location point of the user equipment 130.

According to some optional embodiments, the arrangement 1000 may also comprise a measuring unit 1002. The measuring unit 1002 may be adapted to measure one or more of the measurements: Evolved Universal Terrestrial Radio Access, E-UTRA, Reference Signal Received Power, RSRP, E-UTRA Carrier Received Signal Strength Indicator, E-UTRA carrier RSSI and/or E-UTRA Reference Signal Received Quality, RSRQ.

According to some optional embodiments, the arrangement 1000 may further comprise a receiving unit 1003. The receiving unit 1003 may be adapted to receive the parameter E-UTRA Downlink Reference Signal, DLRS, transmit power from the base station 110.

It is to be noted that any internal electronics of the user equipment 130 not completely necessary for performing the present method according to the method steps 1001-1006, such as e.g. some of the internal electronics of the user equipment 120, 130 depicted in FIG. 4, has been omitted from FIG. 10, for clarity reasons.

It is further to be noted that the described units 1001 and 1006, comprised within the arrangement 1000 in the user equipment 130 are to be regarded as separate logical entities but not with necessity separate physical entities. The obtaining unit 1001, the optional receiving unit 1003, the transmitting unit 1005 and/or the receiving unit 1006 may be comprised or co-arranged within the same physical unit, a transceiver, just to mention one out of several possible options. Such transceiver may comprise a transmitter circuit and a receiver circuit, which respectively transmits outgoing radio frequency signals to the base station 110 and receives incoming radio frequency signals from the base station 110 via an antenna. The antenna may be an embedded antenna, a retractable antenna or any antenna known to those having skill in the art without departing from the scope of the present invention. The radio frequency signals transmitted between the user equipment 130 and the base station 110 may comprise both traffic and control signals e.g., paging signals/ messages for incoming calls, which may be used to establish and maintain a voice call communication with another party or to transmit and/or receive data, such as SMS, e-mail or MMS messages, with a remote user equipment 120.

Some Particular Embodiments

The present methods for providing and retrieving, respectively, geographic region data may be implemented through one or more processors in the positioning node 140 and/or the user equipment 130 together with computer program code for performing the functions of the present methods. The program code mentioned above may also be provided as a computer program product, for instance in the form of a data carrier carrying computer program code for performing the methods according to the respective method steps when being loaded into the processor unit. The data carrier may be e.g. a CD ROM disc, a memory stick, or any other appropriate medium such as a disk or tape that can hold machine readable data. The computer program code may furthermore be provided as pure program code on a server and downloaded to the position node 140 and/or the user equipment 130 remotely.

Thus a computer readable medium encoded with a computer program for providing geographic region data, may perform the method according to the method steps 701-708.

Thus also a computer readable medium encoded with a computer program for retrieving geographic region data associated with the location point of the user equipment 130 may perform the method according to the method steps 901-906.

The invention claimed is:

1. A method in a positioning node for providing geographic region data, the geographic region data comprises geographic position data, the positioning node being in a wireless communication system, the method comprising:
    receiving the geographic position data associated with location points of a first user equipment in the wireless communication system over a multitude of times,
    receiving first Evolved Universal Terrestrial Radio Access Network (E-UTRAN) radio fingerprints, based on a first signal propagation time measurement value measured with respect to the location points of the first user equipment over a multitude of times,
    associating the first E-UTRAN radio fingerprints with the geographic position data over a multitude of times,
    clustering the geographic position data based on similarities with the first E-UTRAN radio fingerprints, to create cluster boundaries defining the geographical region data,
    receiving a second E-UTRAN radio fingerprint, based on a second signal propagation time measurement value measured with respect to a location point of a second user equipment, in the wireless communication system,
    comparing the second E-UTRAN radio fingerprint received from the second user equipment with the first E-UTRAN radio fingerprints being associated with the geographic region data, and
    if the second E-UTRAN radio fingerprint corresponds to at least one of the first E-UTRAN radio fingerprints, associating the geographic region data of the first E-UTRAN radio fingerprints with the location point of the second user equipment, and
    providing the geographic region data, associated with the location point of the second user equipment.

2. The method of claim 1, wherein the first or second signal propagation time measurement value is a signal propagation delay value of a signal sent from the respective first or second user equipment to a base station in the wireless communication system.

3. The method of claim 1, wherein the first or second signal propagation time measurement value is a signal propagation delay value of a signal sent between a base station, and the respective first or second user equipment in the wireless communication system.

4. The method of claim 1, wherein the first or second signal propagation time measurement value is a round trip time of a signal sent back and forth between the respective first or second user equipment and a base station.

5. The method of claim 1, wherein the first or second signal propagation time measurement value is based on a circular correlator.

6. The method of claim 1, wherein the step of providing the geographic region data comprises the sub step of sending the geographic region data via an X2 or a Secure User Plane Location-type interface to any of the following recipients: the second user equipment, another user equipment, an emergency or police call centre, a Geographic Information System server, or a node external to the wireless communication system.

7. The method of claim 1, wherein the first or second E-UTRAN radio fingerprint is further based on one or more of the measurements:
    Evolved Universal Terrestrial Radio Access (E-UTRA), Reference Signal Received Power (RSRP), measured at the respective first or second user equipment,
    E-UTRA Carrier Received Signal Strength Indicator (Carrier RSSI), measured at the respective first or second user equipment,
    E-UTRA Reference Signal Received Quality (RSRQ), measured at the respective first or second user equipment, or
    E-UTRA Downlink Reference Signal (DL RS) transmit power measured at the respective base station associated with the respective first or second user equipment.

8. An apparatus in a positioning node for providing geographic region data, the geographic region data comprising geographic position data, the positioning node being in a wireless communication system, the apparatus comprising:
    a first receiving unit, adapted to receive the geographic position data associated with location points of a first user equipment in the wireless communication system over a multitude of times,
    a second receiving unit, adapted to receive first Evolved Universal Terrestrial Radio Access Network (E-UTRAN) radio fingerprints based on a first signal propagation time measurement value measured with respect to the location point of the first user equipment over a multitude of times,
    a first associating unit, adapted to associate the first E-UTRAN radio fingerprint with the geographic position data over a multitude of times,
    a clustering unit, adapted to cluster the geographic position data based on similarities with the first E-UTRAN radio fingerprints, to create cluster boundaries defining the geographical region data,
    a third receiving unit, adapted to receive a second E-UTRAN radio fingerprint, based on a second signal propagation time measurement value measured with respect to a location point of a second user equipment, in the wireless communication system, a comparison unit, adapted compare the second E-UTRAN radio fingerprint received from the second user equipment with the first E-UTRAN radio fingerprints, previously received from the first user equipment, being associated with the geographic region data, a second associating unit, adapted to associate the geographic region data of the first E-UTRAN radio fingerprints with the location point of the second user equipment, and a providing unit, adapted to provide the geographic region data, associated with the location point of the second user equipment.

9. A method in a user equipment for retrieving geographic region data associated with a location point of the user equipment, the user equipment being in a wireless communication system, which wireless communication system also comprises a positioning node, the method comprising:

obtaining a signal propagation time measurement value, generating an Evolved Universal Terrestrial Radio Access Network (E-UTRAN) radio fingerprint based on the signal propagation time measurement value, transmitting the E-UTRAN radio fingerprint to the positioning node, and receiving the geographic region data as a function of the E-UTRAN radio fingerprint and associated geographic position data of the user equipment from the positioning node.

10. The method of claim 9, wherein the signal propagation time measurement value is a signal propagation delay value of a signal sent from the user equipment to a base station in the wireless communication system.

11. The method of claim 9, wherein the signal propagation time measurement value is a signal propagation delay value of a signal sent from a base station to the user equipment in the wireless communication system.

12. The method of claim 9, wherein the signal propagation time measurement value is a round trip time of a signal sent back and forth between the user equipment and a base station.

13. The method of claim 9, wherein the signal propagation time measurement value is based on a circular correlator.

14. The method of claim 9, further comprising measuring one or more of the measurements:

Evolved Universal Terrestrial Radio Access (E-UTRA), Reference Signal Received Power (RSRP), E-UTRA Carrier Received Signal Strength Indicator (RSSI), E-UTRA Reference Signal Received Quality (RSRQ), and wherein the step of generating an E-UTRAN radio fingerprint is further based on the made one or more measurements.

15. The method of claim 9, further comprising:

receiving a parameter E-UTRA Downlink Reference Signal (DL RS), transmit power measured at a base station, and wherein generating an E-UTRAN radio fingerprint is further based on the parameter.

16. An apparatus in a user equipment for retrieving geographic region data associated with a location point of the user equipment, the user equipment being in a wireless communication system, which wireless communication system also comprises a positioning node, the apparatus comprising:

an obtaining unit, configured to obtain a signal propagation time measurement value, a fingerprint generating unit, configured to generate an Evolved Universal Terrestrial Radio Access Network (E-UTRAN) radio fingerprint based on the signal propagation time measurement value, a transmitting unit, configured to transmit the E-UTRAN radio fingerprint to the positioning node, and a receiving unit, configured to receive the geographic region data as a function of the E-UTRAN radio fingerprint and associated geographic position data of the user equipment from the positioning node.

* * * * *